United States Patent

Oku et al.

[15] 3,692,973
[45] Sept. 19, 1972

[54] ARC WELDING

[72] Inventors: Takeshi Oku, Suita; Kazushige Hirasawa, Ikeda; Yoshimitsu Matsumoto, Toyonaka, all of Japan

[73] Assignee: Matsushita Electric Industrial Co., Ltd., Osaka, Japan

[22] Filed: Sept. 1, 1970

[21] Appl. No.: 68,747

[30] Foreign Application Priority Data

Sept. 4, 1969    Japan ......................44/71519

[52] U.S. Cl. ................................219/121 P, 219/75
[51] Int. Cl. ................................................B23k 9/00
[58] Field of Search ....................219/121 P, 75, 121

[56] References Cited

UNITED STATES PATENTS

| | | |
|---|---|---|
| 3,575,568 | 4/1971 | Tateno ....................219/121 P |
| 2,587,331 | 2/1952 | Jordan.....................219/121 P |
| 3,272,962 | 9/1966 | Mauskapf...............219/121 P |
| 2,906,858 | 9/1959 | Morton, Jr. .............219/121 P |
| 3,534,388 | 10/1970 | Ito et al. ..................219/121 P |

*Primary Examiner*—J. V. Truhe
*Assistant Examiner*—Hugh D. Jaeger
*Attorney*—Stevens, Davis, Miller & Mosher

[57] ABSTRACT

According to the invention, there is provided a method for arc welding, wherein a plasma arc having a high arc energy density may be obtained without using any solid member directly restraining the flaring of the arc but by effectively utilizing two or more concentric gas streams ejected from the torch nozzle for focusing the arc.

14 Claims, 3 Drawing Figures

T. OKU,
K. HIRASAWA
AND
Y. MATSUMOTO
INVENTORS

ARC WELDING

This invention relates to arc welding and more particularly to improvements in the method for arc welding. More specifically, the invention is concerned with a method for arc welding base metals by establishing a stable arc with a high thermal energy density as compared to the arc produced in the prior-art TIG arc method.

The TIG arc method has heretofore been extensively employed in the melting and welding of metals, particularly ferroalloys such as stainless steel and non-ferrous alloys such as an aluminum alloy. With this method, however, the arc produced provides relatively low thermal energy per unit area of the weld zone. Therefore, the depth of penetration is correspondingly small. Also, for a given extent of fusion of the welds, the thermal loss is excessively high. In other words, this method has the disadvantages that the energy density of the arc and the overall welding efficiency are low.

Figure 1:
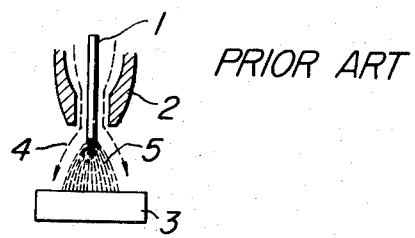
Figure 2:
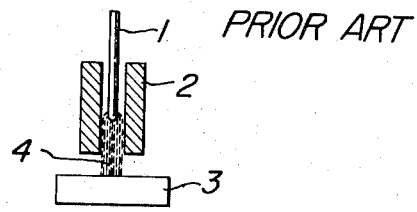
Figure 3:
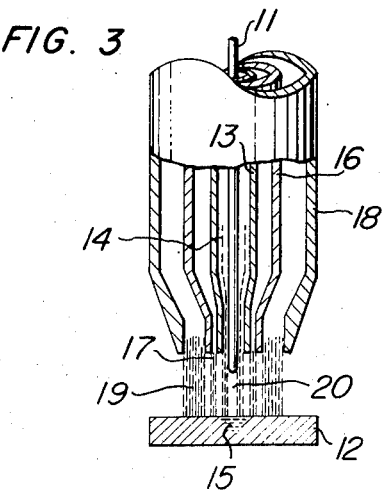

Extensive studies and research on the TIG arc method have heretofore been conducted with the object of overcoming the above disadvantages. By way of example, certain improvements are disclosed in Japan patent publication No. 7860/61. Also, there is known a method for TIG arc cutting. To facilitate the understanding of the invention, some of the prior-art methods, to which the invention pertains, will now be briefly described with reference to the accompanying drawing, in which:

FIGS. 1 and 2 schematically show apparatus for carrying out respective prior-art methods for arc welding; and FIG. 3 shows, partly in section and partly in perspective, an embodiment of the apparatus for carrying out the method for arc welding in accordance with the invention.

A set-up to carry out the conventional TIG arc method is shown in FIG. 1. In the Figure, numeral 1 designates a tungsten electrode, numeral 2 a shield gas nozzle, numeral 3 a base metal, numeral 4 a shield gas film, and numeral 5 an arc. As is seen from the Figure, in the conventional TIG arc method the arc 5 bridging the tungsten electrode 1 and the base metal 3 is flared radially toward the base metal 3. Thus, the energy density of the arc in the weld zone is considerably reduced.

FIG. 2 shows an improvement of the aforementioned conventional method as disclosed in the afore-said Japanese patent publication No. 7860/61. In the Figure, numeral 1 designates a tungsten electrode, numeral 2 an arc focusing guide member, numeral 3 a base metal, and numeral 4 an arc with a shield gas film therearound. As is seen from the Figure, in this welding method the arc bridging the space between the tungsten electrode 1 and the base metal 3 together with the stream of the shield gas is guided through the arc focusing guide member 2 to reduce the cross-sectional arc area as compared to the naturally flaring arc. With this method, the density of the arc energy in the weld zone may be outstandingly increased as compared to the conventional TIG arc method, so that this xx method is extremely effective.

However, the arc focusing guide member 2 shown in FIG. 2 does not focus the arc by merely confining the arc together with the gas stream within its passage of a small cross-sectional area, but it actually cools down the arc to some extent, that is, it gives rise to the so-called thermal pinch effect, in effecting the focusing of the arc. In other words, the arc focusing guide member 2 is subjected to the high temperature of the arc and absorbs the heat of the arc. Therefore, the arc focusing guide member 2 is subject to the significant problem of heavy thermal wear in its practical use. To solve this problem, the guide member should be provided with a cooling structure, for instance for water cooling it. With such cooling means, however, the thermal wear cannot be completely prevented. Besides, such cooling means complicates the construction of the welding torch and makes handling of the torch more involved.

The afore-mentioned method for TIG arc cutting is the one in which flow rate of the shield gas according to the TIG arc method is increased to obtain an arc having an increased thermal energy density. According to this method, a powerful jet of arc plasma may be obtained, and this method has excellent effects in fusing the base metal with the powerful arc plasma to dip and spatter the fused or molten portion of the metal so as to sever the metal. However, this method cannot be adopted to welding.

An object of the invention, accordingly, is to provide a novel method for arc welding, which eliminates the above disadvantages in the prior art and overcomes the above non-compatibility of the prior-art method, and according to which an arc having an extremely high arc energy density may be obtained.

According to the invention, a plasma arc having a high arc energy density may be obtained without using any solid member directly restricting the flaring of the arc, but by effectively utilizing two or more concentric gas streams ejected from the torch nozzle for focusing the arc.

More specifically, according to the invention there is provided a method for arc welding base metals by causing a plasmic arc to bridge the space between said base metals on one hand and an electrode facing said base metals on the other hand, said plasmic arc being produced through a first gas stream surrounding said electrode and directed toward said base metals, a second gas stream surrounding and flowing in the same direction as said first gas stream and, if necessary, a third gas stream surrounding and flowing in the same direction as said second stream, said first gas stream having a sufficiently small cross-sectional area and being constituted by a gas, for which the energy for transition into the arc plasma is low, the velocity of flow of said first gas stream being such that the fused or molten portion of said base metals that results when the arc plasma is created will not be pitted and spattered, said second gas stream satisfying at least any one of the conditions that for the gas constituting said second gas stream the energy for transition into the arc plasma is high as compared to the gas constituting said first gas stream, that the cooling effect of said second gas stream is great, and that the velocity of flow of said second gas stream is high as compared to said first gas stream, and said third gas stream sufficiently shielding said electrode, said plasmic arc and said base metals from atmosphere, whereby the flaring of said plasmic arc is restrained without using a solid member directly restraining the flaring of said plasmic arc.

This invention will now be described in conjunction with an embodiment thereof with reference to FIG. 3. Referring to the Figure, numeral 11 designates an electrode 11 facing a base metal 12. Surrounding the electrode 11 is a first gas nozzle 13, whose outlet opening facing the base metal 12 has a sufficiently small cross-sectional area. The gas ejected from the first gas nozzle 13 constitutes a first gas stream 14. The energy required to create plasma arc from the gas of the first gas stream 14 is relatively small. The velocity of flow of the first gas stream 14 is such that a fused or molten portion 15 of the base metal 12, which results when the plasma arc is created, will not be digged and spattered.

Surrounding the first gas nozzle 13 is a second gas nozzle 16, from which is ejected a second gas stream 17 surrounding and flowing in the same direction as the first gas stream 14. The second gas stream 17 satisfies at least any one of the conditions that the energy required to create arc plasma from its gas is high as compared to the gas constituting the first gas stream 14, that its cooling effect is great, and that its flow rate is high as compared to the first gas stream.

Surrounding the second gas nozzle 16 is a third gas nozzle 18, from which is ejected a third gas stream 19 surrounding the second gas stream 17. The third gas stream 19 serves to protect or shield the arc from the atmosphere, and may thus be used where it is necessary.

Numeral 20 designates an arc having a high arc energy density produced by the method according to the invention. The individual gas nozzles are disposed such that they will not be directly exposed to the arc produced between the electrode 11 and the base metal 12.

The method according to the invention is based on the operational principles described hereinbelow.

In the afore-described TIG arc method, the arc produced between the electrode and the base metal flares radially. In contrast, in the method according to the invention the arc is restrained from flaring through the combination of the first and second gas streams 14 and 17.

Because of the facts that the first gas stream 14 has a sufficiently small cross-sectional area, that for its gas a low energy is required for transition into plasma, and that its velocity of flow is low, the potential gradient across the produced arc is low. As a result, the arc is confined within the zone of the first gas stream 14.

Also, because of the fact that the second gas stream 17 satisfies at least any one of the conditions that its gas requires a high energy for transition into plasma as compared to the gas constituting the first gas stream 14, that it has a great cooling effect, and that its velocity of flow is high as compared to the first gas stream, the second gas stream in suit is hardly capable of constituting the path for the arc, so it confines the arc within the first gas stream while cooling the arc therewithin to focus the same. Thus, if the second gas stream is at a high velocity of flow as compared to the first gas stream and/or has a great cooling effect, it promotes the recombination of ion-electron pairs in the plasma arc at the boundary between the second gas stream and the first gas stream to increase the thermal loss, so that the cross-sectional area of the cylindrical arc is reduced to cope with the increase in the thermal loss. Thus, the arc is rendered thinner to provide for a higher arc energy density. Also, it is rendered stable as it is confined within the zone of the first gas stream. If the second gas stream is of a gas, for which a high energy is required for transition into the plasma state as compared to the first gas stream, the transition into the plasmic state is more difficult in the zone of the second gas stream than in the zone of the first gas stream, so that the second gas stream promotes the afore-said recombination effect, contributing to confine the arc within the first gas stream zone.

As is described, by providing two or more concentric gas streams respectively satisfying the afore-mentioned conditions through respective zones or passages, it is possible, by virtue of the overall effect of these gas streams, to obtain a focused arc, which has a high arc energy density and is suitable for welding, without using any arc focusing guide member directly subjected to the arc unlike the method as disclosed in the Japanese patent publication No. 7860/61 and without ejecting the gas stream at a high flow rate through the arc zone unlike the prior-art TIG arc cutting method.

Experiments reveal that to obtain the effects of the invention it is essential that both the first and second gas streams, as well as the third gas stream if it is incorporated, should satisfy their respective conditions as mentioned above simultaneously. Otherwise, the effects of the invention cannot be obtained. For example, if the second gas stream alone satisfies its condition as mentioned above, no effects of the invention will be obtained. Thus, to obtain the same effects as according to the invention with a method other than the method according to the invention, it is necessary to incorporate, for instance, the method as disclosed in Japanese patent publication No. 7860/61.

To put the method according to the invention into practice, the gas constituting the first gas stream may be an inert gas or a mixture of inert gases. The flow rate of the first gas stream is of course to be determined by taking the flow rate of the second gas stream into consideration. In practice, it is preferably below about 2 m/sec. The cross-sectional area of the first gas stream zone should be as small as possible. In practice, however, there is a lower limit for this area in order to maintain it constant up to the immediate vicinity of the base metal. It is preferably about 2 to 5 mm, though it depends upon the arc current.

Regarding the gas constituting the second gas stream, if a gas with a high energy to create the arc plasma as compared to the first gas stream is to be used, an inert gas for which the energy for the arc plasma formation is higher (for instance helium rather than argon), or a mixture of such inert gases is more suitable than a molecular gas (for instance $CO_2$ and $N_2$), which, unlike an inert gas, requires a dissociation energy, or the gas constituting the first gas stream. If a gas providing for a great cooling effect is to be selected, a gas possessing a small molecular weight (for instance, He and $H_2$) or a mixture containing such gas is appropriate. At any rate, it is advantageous that the velocity of flow of the second gas stream is high as compared to the first gas stream. By way of example, a gaseous mixture containing A, $CO_2$ or $H_2$ as the gas constituting the second gas stream may be used for the welding of ferroalloys. As for the velocity of flow, it is effective to have over about twice the velocity of flow of the first gas stream for the second gas stream.

The third gas stream may be selected in a manner as in the selection of the ordinary shield gas, as it is used, if necessary, to protect the electrode, arc and base metals from the atmosphere. It is particularly essential if the velocity of flow of the second gas stream is high, for the purpose of eliminating the intrusion of external air.

The gas of the gas streams, of course, should not have any undesired effect on the weld portion.

As has been described in the foregoing, the method for arc welding according to the invention enables readily obtaining a plasma arc having a high arc energy density as compared to the conventional TIG arc method. Also, as the apparatus involved is free from the portion directly subjected to the arc unlike the conventional apparatus for generating a plasma arc, the welding torch may be simplified in construction and its service life may be extended.

What is claimed is:

1. A method of welding base metals comprising the steps of producing an electric arc between said base metal and an electrode facing said base metal, flowing a first gas stream comprising a gas in which an electric plasma arc is producible by a relatively low energy, in a direction toward said base metal to surround and in contact with at least the part of said electrode closest to said base metal and to surround said electric arc, and producing a plasma arc in said first gas stream, said first gas stream having a sufficiently small transverse cross-sectional area and velocity so that it does not dig and spatter the molten portion of said base metal when said plasma arc is produced therein, and flowing a second gas stream comprising a gas in which an electric plasma arc is producible by a larger energy than the plasma arcing energy of the gas of said first gas stream, said second gas stream flowing in the same direction as said first gas stream and surrounding said first gas stream, said second gas stream also constricting the electric arc within the flow of said first gas stream, thereby converting the electric arc to an electric plasma arc and constricting the plasma arc in a desired range without any solid mechanical constricting member closer to the base metal than the tip of said electrode.

2. The method of welding base metals according to claim 1, wherein the gas comprising said second gas stream has a cooling capacity for the plasma arc which is larger than the cooling capacity of the gas comprising said first gas stream.

3. The method of welding base metals according to claim 1, wherein said second gas stream has a higher velocity than that of said first gas stream.

4. The method of welding base metals according to claim 2, wherein the gas comprising said second gas stream has a higher velocity than the velocity of said first gas stream.

5. The method of welding base metals according to claim 1, wherein said first gas stream comprises argon, and said second gas stream comprises $CO_2$.

6. A method of welding base metals comprising the steps of providing an electric plasma arc between a base metal and an electrode facing said base metal, flowing a first gas stream in a direction toward said base metal and surrounding and in contact with at least the part of said electrode closest to said base metal and surrounding said electric arc and producing a plasma arc in said first gas stream, said first gas stream having a sufficiently small transverse cross-sectional area and velocity so that it does not dig and spatter the molten portion of said base metal when said plasma arc is produced therein, and flowing a second gas stream in the same direction as said first gas stream and surrounding said first gas stream, the gas of said second gas stream having a cooling capacity for the plasma arc greater than the cooling capacity of said first gas stream, said second gas stream flowing at a sufficient velocity to constrict the plasma arc within the flow of said first gas stream, whereby said plasma arc is constricted in a desired range without any solid mechanical constricting member closer to the base metal than the tip of said electrode.

7. The method of welding base metals according to claim 6, wherein said second gas stream has a velocity higher than that of said first gas stream.

8. The method of welding base metals according to claim 1, further comprising the step of flowing a third gas stream in the same direction of said second gas stream so that said electrode, said plasma arc, and the molten portion of said base metal are protected from the ambient atmosphere.

9. The method of welding base metals according to claim 2, further comprising the step of flowing a third gas stream in the same direction of said second gas stream so that said electrode, said plasma arc, and the molten portion of said base metal are protected from the ambient atmosphere.

10. The method of welding base metals according to claim 3, further comprising the step of flowing a third gas stream in the same direction of said second gas stream so that said electrode, said plasma arc, and the molten portion of said base metal are protected from the ambient atmosphere.

11. The method of welding base metals according to claim 5, further comprising the step of flowing a third gas stream in the same direction of said second gas stream so that said electrode, said plasma arc, and the molten portion of said base metal are protected from the ambient atmosphere.

12. The method of welding base metals according to claim 6, further comprising the step of flowing a third gas stream in the same direction of said second gas stream so that said electrode, said plasma arc, and the molten portion of said base metal are protected from the ambient atmosphere.

13. The method of welding base metals according to claim 7, further comprising the step of flowing a third gas stream in the same direction of said second gas stream so that said electrode, said plasma arc, and the molten portion of said base metal are protected from the ambient atmosphere.

14. The method of welding base metals according to claim 8, wherein said first and third gas streams comprise argon, and said second gas stream comprises $CO_2$.

* * * * *